United States Patent [19]

Kanno

[11] 4,166,675
[45] Sep. 4, 1979

[54] CLICK STOP DEVICE IN A CAMERA LENS BARREL

[75] Inventor: Hideo Kanno, Kawasaki, Japan

[73] Assignee: Nippon Kogaku K.K., Tokyo, Japan

[21] Appl. No.: 837,729

[22] Filed: Sep. 29, 1977

[30] Foreign Application Priority Data

Oct. 5, 1976 [JP] Japan .......................... 51-133357[U]

[51] Int. Cl.² .............................................. G02B 7/02
[52] U.S. Cl. .................................................. 350/252
[58] Field of Search ........................ 350/252, 255, 187

[56] References Cited

U.S. PATENT DOCUMENTS 3,841,735 10/1974 Kataguri et al. ................. 350/255 X
3,895,858 7/1975 Sawano ............................... 350/255
3,970,368 7/1976 von Belvard ........................ 350/187

Primary Examiner—F. L. Evans
Attorney, Agent, or Firm—Fitzpatrick, Cella, Harper & Scinto

[57] ABSTRACT

In a camera lens barrel having a stationary barrel and a distance ring, a click stop device comprises a ring for setting the restrained position of the distance ring disposed on the stationary barrel with a predetermined clearance with respect to the distance ring, a screw manually operable to fix the set ring to the stationary barrel at any desired position, and a pair of click stop means provided between the distance ring and the set ring so as to engage each other within the clearance.

3 Claims, 3 Drawing Figures

CLICK STOP DEVICE IN A CAMERA LENS BARREL

BACKGROUND OF THE INVENTION

1. Field of the Invention

This invention relates to a click stop device for the distance ring on a camera lens barrel, and more particularly to a device for stopping the rotation of the distance ring at a predetermined position.

2. Description of the Prior Art

Device of this type have conventionally been intended to ensure that a steel ball provided in the distance ring would be urged against the outer periphery of a stationary lens barrel until rotation of the distance ring causes the steel ball to be received in a groove formed in the stationary lens barrel, thereby click-stopping the distance ring when the steel ball has been received in the positionally predetermined groove. In such a device, therefore, manipulation of the distance ring feels very heavy due to the pressure force of the steel ball existing until the steel ball is received in the groove, and this has led to the difficulties with which the distance ring is operated.

SUMMARY OF THE INVENTION

It is an object of the present invention to eliminate the above-noted disadvantages and to provide a click stop device which ensures good operability of the distance ring.

According to the present invention, the click stop device in a camera lens barrel having a stationary barrel and a distance ring comprises a ring for setting the restrained position of the distance ring rotatably disposed on the stationary barrel with a predetermined clearance with respect to the distance ring, means manually operable to fix the set ring to the stationary barrel at any desired position, and a pair of click stop means provided between the distance ring and the set ring so as to engage each other within the clearance.

The click stop means may comprise a protruded portion having a groove and provided on one of the distance ring or the set ring so as to be projected into the clearance, and a restraining member engageable with the groove in the protruded portion and provided on the other of the distance ring or the set ring. The angle of rotation of the distance ring may be less than 360°, and the protruded portion may be formed within an angle less than the difference between 360° and the angle of rotation of the distance ring.

The invention will become more fully apparent from the following detailed description of an embodiment thereof taken in conjunction with the accompanying drawings.

DESCRIPTION OF THE PREFERRED EMBODIMENTS

Figure 1:
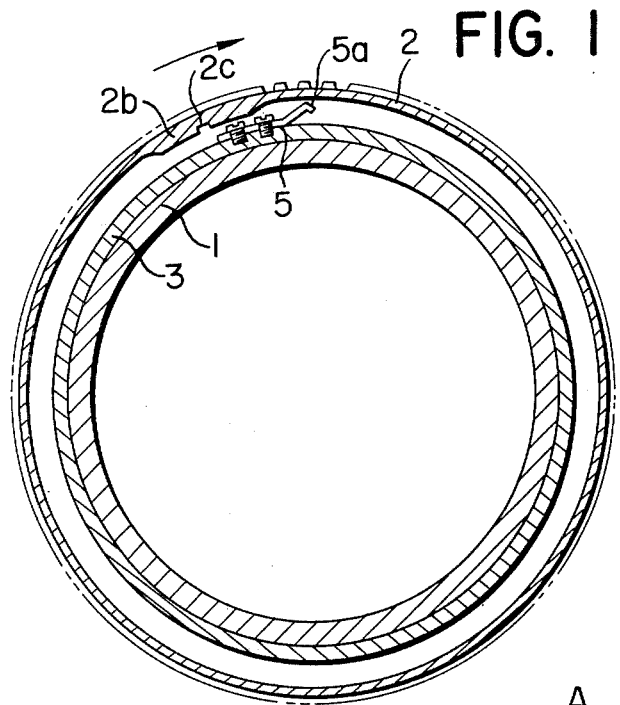
FIGS. 1 to 3 show an embodiment of the present invention, FIG. 1 being a front cross-sectional view showing the distance ring in its position before being click-stopped, FIG. 2 being a front cross-sectional view showing the distance ring in its click-stopped position, and FIG. 3 being a cross-sectional view taken along line A in FIG. 2.
Figure 2:
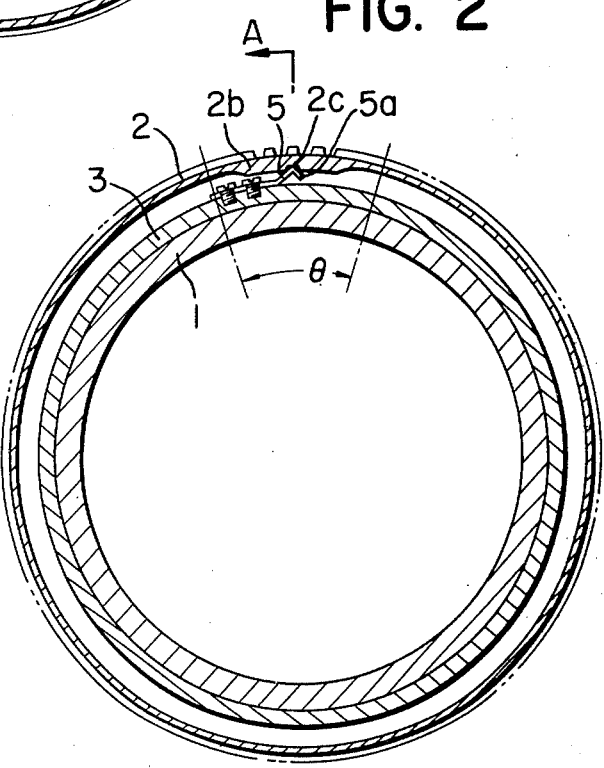
Figure 3:
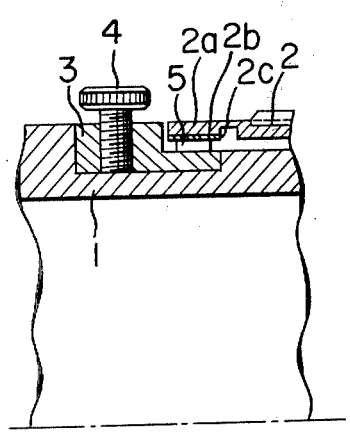

Referring to FIGS. 1 to 3, there is shown the lens barrel according to an embodiment of the present invention, FIGS. 1 and 2 being front cross-sectional views thereof. FIG. 1 shows the distance ring in its position before being click-stopped, and FIG. 2 shows the distance ring in its click-stopped position. FIG. 3 is a cross-sectional view taken along line A in FIG. 2.

In these drawings, the distance ring 2 is provided around a stationary lens barrel 1 and both of them are of conventional design. A restrained position set ring 3 is also provided around the stationary ring 1 and is rotatable in the same direction as the distance ring 2. The set ring 3 has a fixing screw 4 as shown in FIG. 3, and may be secured to the stationary lens barrel by means of this screw 4. The end 2a of the distance ring 2 is disposed with a predetermined clearance with respect to the set ring 3 in a direction perpendicular to the optic axis. A restraining member 5 is an L-shaped resilient member having one end secured to the outer periphery of the set ring 3 and having the other end projected into the aforementioned clearance. The inside of the distance ring end 2a is formed with a protruded portion 2b which has a click groove 2c formed centrally thereof for receiving the L-shaped horn 5a of the restraining member 5.

Operation will now be described. Assume that the restrained position set ring 3 is pre-fixed at a location for stopping the distance ring 2 at a predetermined position. When the distance ring 2 is rotated clockwise from the position of FIG. 1, namely, the position in which the tip end of the restraining member 5 is out of contact with the inner periphery of the distance ring 2, the tip end of the restraining member 5 is brought into contact with the ramp of the protruded portion 2b. As the distance ring 2 is further rotated, the tip end of the restraining member 5 is depressed by the protruded portion 2b. As the distance ring 2 is still further rotated, the horn 5a at the end of the restraining member is received in the click groove 2c to click-stop the distance ring 2, as shown in FIGS. 2 and 3.

Description will now be made of the operation involved to fix the restrained position set ring 3 to click-stop the distance ring 2 at a desired position. First, the restraining member's horn 5a is caused to be received in the click groove 2c of the distance ring protruded portion, and then the screw 4 is loosened to release the set ring 3 from its fixed condition. Thus, the distance ring 2 and the set ring 3 become rotatable together after that. In this position, the distance ring 2 is rotated to effect focusing to a desired distance. In that position, the set ring 3 is again fixed to the stationary lens barrel by means of the screw 4, whereby the set ring 3 may be set to a position in which the distance ring may be click-stopped at a desired location.

When an object at a predetermined distance is to be photographed, if the stop position of the distance ring 2 is preset by the restrained position set ring 3 in the described manner, focusing can be accomplished on the spot immediately thereafter.

In the present embodiment, the distance ring end 2a is disposed with a predetermined clearance with respect to the restrained position set ring 3 in the radial direction, but instead, the predetermined clearance may of course be in the direction of the optic axis.

Although the prtrouded portion 2b is provided to the distance ring 2 and the restraining member 5 is provided to the set ring 3, these may be provided in the opposite manner.

Further, if the angle of rotation of the distance ring is chosen to less than 360° and the angle θ occupied by the protruded portion 2b is selected to less than the difference between 360° and the angle of rotation of the distance ring, it will also be possible to fix the restrained position set ring 3 at a position in which the distance ring protruded portion 2b will not come to face the restraining member 5 even if the distance ring 2 is rotated.

According to the present invention, as will be appreciated, the rotation of the distance ring does not feel heavy until the restraining member provided to one of the restrained position set ring and the distance ring comes to face the protruded portion provided to the other of them, so that the distance ring can be rotated easily till such time, thus improving the operability. Moreover, when manipulation of the distance ring feels light, one can known that the focus is far out of the predetermined focus, and when manipulation of the distance ring feels heavy, one can know that the predetermined focus is approached. This arrangement provides a great excellence in operability.

What I claim is:

1. A click stop device in a camera lens barrel having a stationary barrel and a distance ring comprising:
    an intermediate ring rotatably disposed on said stationary barrel with a predetermined clearance with respect to said distance ring;
    means manually operable to fix said intermediate ring to said stationary barrel at any desired position; and
    click stop means comprising two separate elements, one of which is provided on said distance ring and the other on said intermediate ring so as to engage each other within said clearance.

2. A click stop device according to claim 1, wherein one of said two separate elements of said click stop means is a protruded portion having a groove and the other of said two separate elements is a restraining member engageable with said groove in said protruded portion.

3. A click stop device according to claim 2, wherein the angle of rotation of said distance ring is less than 360°, and said protruded portion is formed within an angle less than the difference between 360° and the angle of rotation of said distance ring.

* * * * *